Nov. 24, 1942.   A. E. JOHNSON   2,302,959
PISTON RING
Filed Feb. 21, 1940
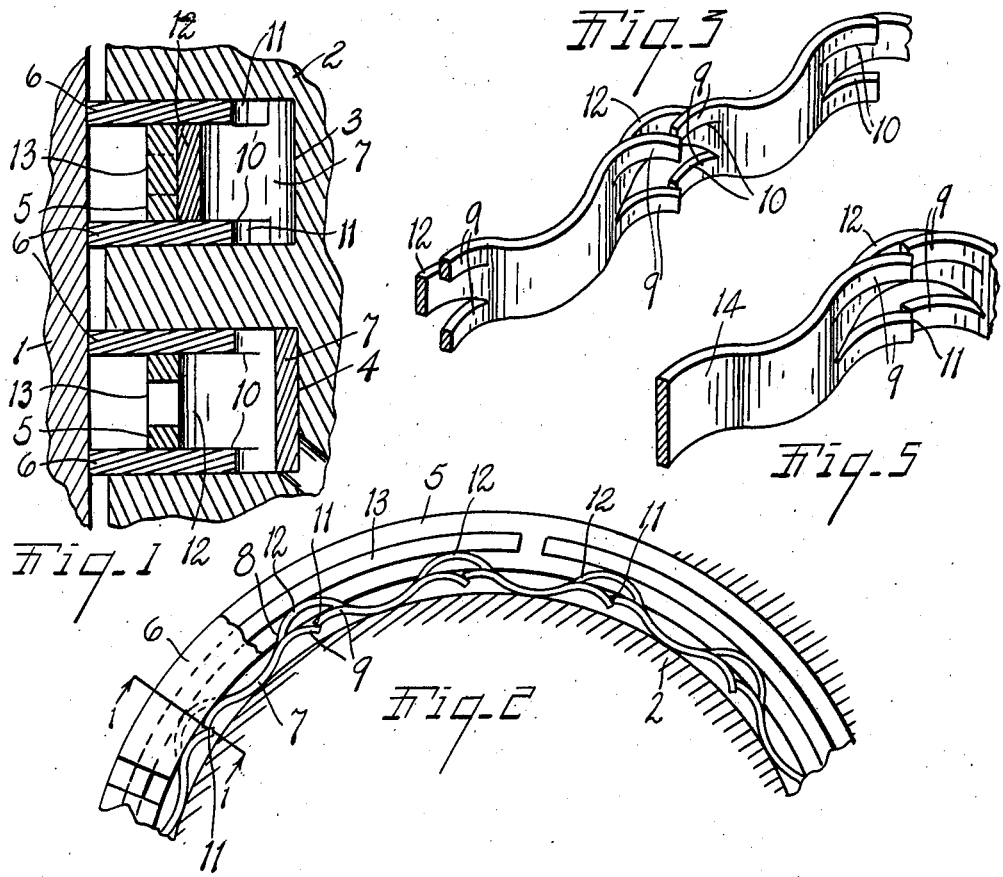
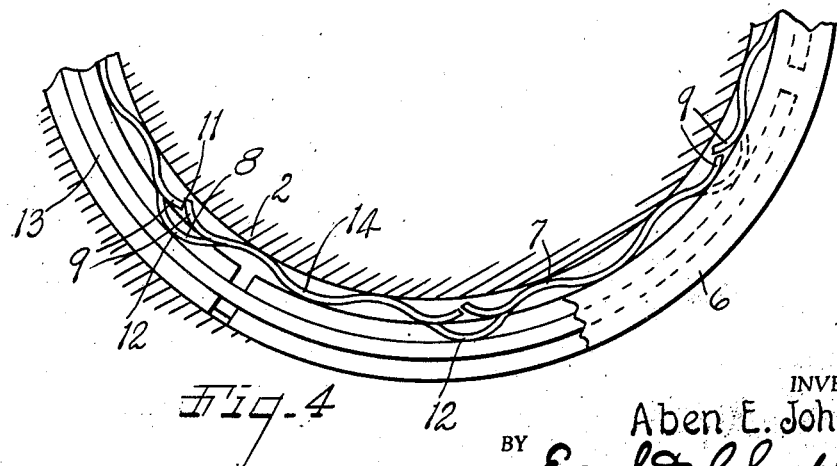
INVENTOR.
Aben E. Johnson
BY Earl & Chappell
ATTORNEYS Patented Nov. 24, 1942

2,302,959

UNITED STATES PATENT OFFICE 2,302,959

PISTON RING

Aben E. Johnson, Hastings, Mich., assignor to Hastings Manufacturing Company, Hastings, Mich., a corporation of Michigan Application February 21, 1940, Serial No. 320,004

3 Claims. (Cl. 309—45)

This invention relates to improvements in piston rings.

The main objects of this invention are:

First, to provide a novel composite piston ring assembly for internal combustion engines and the like, which is economical of production and effective in operation.

Second, to provide an assembly of the type described including a plurality of axially spaced cylinder wall engaging elements and an expander of novel construction coacting therewith to maintain the same axially spaced and exert independent and substantial radial expansive action on the same.

Third, to provide an assembly of the type described wherein the segments are independently urged outwardly by the expander spring provisions of my invention, whereby to secure a very desirable independent sealing action on the cylinder wall for sealing irregularities in the surface thereof.

Objects relating to details and economies of the invention will appear from the description to follow. The invention is defined in the claims.

Preferred embodiments of the invention are illustrated in the accompanying drawing, wherein:

Fig. 1 is an enlarged fragmentary view in vertical section illustrating two installations of a piston ring assembly in accordance with my invention, the uppermost thereof being viewed on a line corresponding to line 1—1 of Fig. 2.

Fig. 2 is a fragmentary side view partially broken away and in horizontal section, illustrating the constituent elements of the assembly of my invention in their operative relation in installed position in a piston ring groove.

Fig. 3 is a fragmentary perspective view more clearly illustrating details of construction of the novel expander spring constituting an essential element of my assembly.

Fig. 4 is a view generally similar to Fig. 2, illustrating a slightly modified embodiment of the assembly in operative installed position.

Fig. 5 is a fragmentary perspective view similar to Fig. 3, illustrating the modified type of expander spring which is utilized in the embodiment of Fig. 4.

The present invention relates in general to a composite piston ring assembly such as that disclosed in the patent to Phillips No. 2,148,997, dated February 28, 1939, likewise to an assembly of the type constituting the subject matter of my copending application Serial No. 320,003, filed concurrently herewith. In the present assembly, I have made improvements in the expanding spring of assemblies of the type mentioned, whereby the same is enabled to have an improved expanding action on the cylinder wall engaging elements or segments of the assembly to urge the same independently outward with a relatively high unit cylinder wall tension.

Referring to the drawing, the reference numeral 1 indicates the cylinder of an internal combustion engine or the like, wherein a piston 2 is reciprocably mounted. The piston is provided with a plurality of grooves 3, 4, each of which is provided with an assembly in accordance with my invention and generally indicated by the reference numeral 5.

This assembly includes a pair of thin split expansible cylinder wall engaging elements 6 of ribbon steel or other hard, wear resistant material disposed in axially spaced relation for edge engagement with the cylinder wall and being resiliently thrust thereagainst in part by their inherent expansive action. An inner split expanding spring 7 is disposed in the piston ring groove behind the cylinder wall engaging segments 6. This spring serves the dual function of increasing the radial thrust of the segments on the cylinder wall by resilient engagement therewith, and of maintaining said elements in axially spaced relation. The configuration of this spring is clearly illustrated in Fig. 2.

Spring 7 is in the form of a thin split annular strip of spring metal provided with a plurality of circumferentially spaced convex crimps generally designated 8. The axial width of the strip is substantially equal to the axial dimension of the ring groove having however free radial expansible action therein. At the crimps thereof rearwardly curved spring tongues 9 are cut or stamped out from the strip on both edges thereof by horizontally and axially slitting the material, as indicated at 10, 11, respectively, see Figs. 1 and 2. The axial slit 11 which separates the adjacent extremities of the tongues is preferably located at a point to one side of the center of the crimp, so that one tongue of each pair will be somewhat longer than the other. The tongues are curved rearwardly at these extremities and are adapted to be engaged with the steel wall engaging segments 6 upon insertion of the assembly in a piston ring groove, being deflected rearwardly thereby and serving independently to impart radial thrust to the segments.

The parallel horizontal slits 10 separating tongues 9 from the intermediate portion of the expander spring are located at an axial distance from one another substantially equal to the desired axial spacing of the wall engaging segments 6. Thus, the portion 12 of the crimp remaining after the slitting and offsetting of tongues 9 projects outwardly between the cylinder wall engaging segments contacting the adjacent sides thereof and maintaining the segments in desired axially spaced relation. Of course, the portions of the spring connecting the aforesaid convex crimps engage the bottom of the ring groove.

In order to prevent any possibility of the crimps engaging the cylinder wall following extreme wear of the steel segments 6, I preferably provide an annular split combined guard and spacer member 13 disposed between the segments 6. This material may be of a relatively soft metal such as brass and is centered on the projecting portions 12 of crimps 8. As stated, it is preferably of such width as to provide an auxiliary spacing element for the segments 6 although it is desirable even if this feature be omitted.

From the foregoing, it will be apparent that modifications in the manner of forming the segment engaging spring tongues 9 or in the arrangement or disposition thereof relative to the projecting crimp portions 12 may be readily made and I desire such modified adaptations as would occur to those skilled in the art to be included as a part of my invention within the scope of the appended claims.

In Figs. 4 and 5, I illustrate a modified embodiment of my invention wherein each pair of slitted crimps 8 is separated by an intervening multiple crimped portion 14 of full axial width, which insures a very stable engagement of the cylinder wall engaging segments 6 by the expander spring while at the same time retaining the independence of the expansive action exerted thereon by the independently acting spring tongues 9.

The above described assemblies have the advantage that the separate spring tongues permit the steel segments to be readily associated with the expander in desired operative position in the groove, while at the same time they exert an adequate expansive action thereon to secure a very effective cylinder wall engaging element. Moreover, this expanding action is independent, so far as the two segments 6 are concerned, and assures that a good sealing engagement with irregular portions of the cylinder wall will be had. The guard strip assures that no scoring of the cylinder wall will occur by reason of engagement thereof by the expander spring following extreme wear, however, if desired, this strip may be omitted. In any event, if desired, the crimps 8 may be utilized to provide the sole spacing action for the segments 6, the strip 13 merely floating in the space between the segments, though centered on the projecting crimps thereof.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. A piston ring assembly comprising a pair of thin split expansible cylinder wall engaging segments of wear-resisting material disposed in axially spaced relation, an expander spring adapted to be disposed behind said segments in a piston ring groove for supporting engagement with the bottom of the groove, said expander spring having a plurality of outwardly bowed spacer crimps therein, said spacer crimps having opposed pairs of integral spring tongues of substantial circumferential extent formed on the edges thereof for independent expanding engagement intermediate the length thereof with the rear edges of said segments, the portions of the crimps disposed axially between said tongues having an axial width substantially equal to the spacing of the segments and projecting therebetween to maintain the segments in axially spaced relation, said tongues having independent flexure relative to said last named segment spacing portions.

2. A piston ring assembly comprising a pair of thin split expansible cylinder wall engaging segments of wear resisting material disposed in axially spaced relation, and an inner expanding spring adapted to be disposed behind said segments in engagement with the bottom of a piston ring groove, said spring comprising a strip of spring metal having a plurality of spacer crimps therein, said crimps having a pair of integral spring tongues formed on each of the top and bottom edges thereof flexing independently of the flexure of the strip for independent expanding engagement with the rear surfaces of said segments, and means for maintaining the segments in axially spaced relation.

3. An expanding spring for a composite piston ring assembly, comprising a thin strip of spring metal adapted to be disposed in a piston ring groove and having a plurality of convex spacer crimps therein, said crimps having spring portions located substantially in circumferential register with said crimps, said portions having radial expanding engagement independently of one another with axially spaced cylinder wall engaging segments disposed in the groove, said crimps being dimensioned axially adjacent said portions to project between said segments to maintain the same in axially spaced relation, said spring portions having independent flexure relative to said spacer crimps.

ABEN E. JOHNSON.